United States Patent [19]

Beecher

[11] Patent Number: 5,172,121
[45] Date of Patent: Dec. 15, 1992

[54] SYSTEM FOR AUTOMATIC IDENTIFICATION OF RAIL CARS

[75] Inventor: Dennis L. Beecher, Hammonton, N.J.

[73] Assignee: Consolidated Rail Corp., Philadelphia, Pa.

[21] Appl. No.: 694,004

[22] Filed: Apr. 30, 1991

[51] Int. Cl.⁵ .............................................. G01S 13/80
[52] U.S. Cl. ......................................... 342/51; 342/44
[58] Field of Search ............................. 342/51, 44, 42

[56] References Cited

U.S. PATENT DOCUMENTS

| | | | |
|---|---|---|---|
| 3,713,148 | 1/1973 | Cardullo et al. | 342/42 |
| 3,855,592 | 12/1974 | Davis et al. | 342/44 |
| 3,878,528 | 4/1975 | Majeau | 342/44 |
| 3,940,765 | 2/1976 | Grafinger et al. | 342/51 |
| 4,068,232 | 1/1978 | Meyers et al. | 342/44 |
| 4,075,632 | 2/1978 | Baldwin et al. | 343/6.8 |
| 4,123,754 | 10/1978 | Armstrong | 342/44 |
| 4,331,957 | 5/1982 | Enander et al. | 342/22 |
| 4,512,096 | 4/1985 | Heidecker | 40/304 |
| 4,728,922 | 3/1988 | Christen et al. | 340/52 R |
| 4,737,759 | 4/1988 | Stropkay et al. | 340/52 H |
| 4,739,328 | 4/1988 | Koelle et al. | 342/44 |
| 4,782,345 | 11/1988 | Landt | 343/727 |
| 4,786,907 | 11/1988 | Koelle | 342/51 |
| 4,805,657 | 2/1989 | Carman et al. | 137/68.2 |
| 4,816,839 | 3/1989 | Landt | 343/795 |
| 4,820,101 | 4/1989 | Fenn | 414/21 |
| 4,835,377 | 5/1989 | Brown | 235/492 |
| 4,853,705 | 8/1989 | Landt | 343/803 |
| 4,864,158 | 9/1989 | Koelle et al. | 307/231 |
| 4,945,354 | 7/1990 | McColl | 342/44 X |
| 4,948,369 | 8/1990 | Braccio et al. | 439/347 |
| 4,980,689 | 12/1990 | Kawakami | 342/51 |
| 4,992,794 | 2/1991 | Brouwers | 342/51 |
| 4,998,102 | 3/1991 | Wyler et al | 340/870.020 |
| 5,088,447 | 2/1992 | Spencer et al. | 119/51.02 |

OTHER PUBLICATIONS

Gus Welty, "Mandatory AEI Tagging," Railway Age, Mar. 1991, pp. 34-38.
Amtech Advertisement, Railway Age, Mar. 1991, p. 36.
Todd Allan Goff of PTMW Inc. correspondence of Dec. 20, 1990 to Consolidated Rail Corporation — D.L. Beecher.

Primary Examiner—John B. Sotomayor
Attorney, Agent, or Firm—Woodcock Washburn Kurtz Mackiewicz and Norris

[57] ABSTRACT

A system is provided for automatic identification of objects, such as rail cars and the like, utilizing two transponders, each attached to the rail car by a bracket. The bracket, which is welded along its ends to the rail car, has a lower planar surface which is placed against the side of the rail car when the bracket is welded thereto. A bottom planar surface of the transponder mates with an upper planar surface of the bracket, thus ensuring a good conduction heat flow path to the rail car and preventing over heating of the transponder when the rail car is placed in a thaw shed. The transponder is attached to the bracket by inserting a flange formed one end of the transponder under a clip projecting from the upper surface of the bracket. A threaded stud projecting upward from the bracket upper surface extends through a hole in a second flange formed at the other end of the transponder. The controlled length of the stud, and the use of an acorn nut and conical washer threaded onto the stud to clamp the transponder to the bracket, prevents generating excessive clamping force.

13 Claims, 3 Drawing Sheets

SYSTEM FOR AUTOMATIC IDENTIFICATION OF RAIL CARS

FIELD OF THE INVENTION

The current invention relates to a system for automatically identifying rail cars by means of transponders installed on each rail car and readers dispersed at intervals adjacent the railroad track system throughout the United States. Each transponder contains a unique identification code identifying the rail car and is attached thereto via a novel bracket.

BACKGROUND OF THE INVENTION

There is currently a fleet in excess of one million rail cars operating in the United States. Keeping track of the movement of each of these rail cars as they are interchanged between railroads is a daunting task, yet one which must be accomplished accurately and economically to maintain competitiveness with other transportation methods. Accordingly, the Association of American Railroads has adopted an Automatic Equipment Identification (AEI) program. Under this program, two transponders will be attached to each rail car, one on each side of the car. Each transponder has a unique code stored within its memory which identifies the individual rail car. Readers will be dispersed throughout the track system in the United States to read the transponders. The data from the readers will be fed into a central processing unit so that information on the location and direction of travel of each car can be continuously and automatically updated.

In view of the large number of rail cars which must be "tagged" with transponders, it is vital to the success of this program that a reliable, inexpensive and labor saving method be developed for attaching the transponders to the rail cars. In the past, glue or double sided adhesive tape has been used to attach the transponders. However, the long term durability of such attachments is questionable. In addition, transponders have been attached directly to the sides of rail cars by screws and pop rivets. However, this approach is labor intensive and is impractical with tank cars.

More recently, it has been proposed to attach the each transponder to its rail car via a bracket welded to the side of the rail car. Under this approach, a primary bracket having inward facing edges around its periphery is placed against the side of the rail car so that only the edges contact the car. The primary bracket is then welded along its sides to the rail car. In order to attach the transponder to the primary bracket, each of the transverse ends of the transponder are slipped under fingers extending from the face of the primary bracket and two screws are threaded into the primary bracket, one screw extending through each of two holes located in flanges formed at each end of the transponder. A secondary bracket is then installed adjacent one longitudinally extending side of the transponder and the secondary bracket is attached to the primary bracket by two additional screws.

Unfortunately, the attachment system described above suffers from several serious disadvantages that could jeopardize the successful implementation of the AEI program. First, since the bracket contacts the rail car along only the inward facing edge of the primary bracket, there is a poor conduction heat transfer path between the transponder and the rail car. As a result, when the rail car is cycled through a thawing shed, in which the car and its contents are briefly heated—for example, by infra red lamps—to allow bulk material to be unloaded during sub-freezing weather, the transponder can become overheated and damaged because of the inability to rapidly transfer large quantities of heat to the large thermal mass of the rail car. Second, the installation of the transponder and bracket is labor intensive, involving the installation of four screws and two bracket components. This is a significant drawback since successful implementation of the AEI program will require installing over two million transponders. Third, since the primary bracket blocks access to the transponder memory port, the transponder must be programmed with its unique identification code prior to its assembly to the bracket. This situation precludes assembling the transponder and bracket in the factory and storing them as a unit until the transponder is ready to be programmed and matched with a rail car. Fourth, if the screws attaching the transponder to the bracket are over torqued, the plastic transponder attachment flanges can be cracked, thereby requiring replacement of the transponder. Since two transponders are required for each rail car, breakage of one transponder requires reprogramming another transponder with the appropriate individual identification code of the rail car.

Accordingly, it would be desirable to provide a system for automatic identification of rail cars which featured a method of attaching a transponder to a rail car which was labor saving, provided good heat conduction to the rail car, precluded over torquing of the attaching means, and allowed programming the transponder memory after assembly of the transponder to its attachment bracket.

SUMMARY OF THE INVENTION

It is an object of the invention to provide a transponder based system for automatic identification of objects, such as rail cars and the like, which features an apparatus which allowed attaching the transponder to the rail car with a minimum expenditure of labor.

It is another object of the invention that the attachment apparatus provide a good heat conduction path to the rail car to avoid overheating of the transponder.

It is yet another object of the invention that the attachment apparatus allow the transponder memory to be programmed after the transponder has been assembled to the attachment apparatus.

It is still another object of the invention that the attachment apparatus have means for ensuring that excessive force is not applied to clamp the transponder to the apparatus.

These and other objects are accomplished in a system for automatic identification of rail cars, having (i) a transponder adapted to transmit a first signal containing information identifying the rail car when interrogated, (ii) a reader adapted to interrogate the transponder by transmitting a second signal thereto and to receive and decode the first signal transmitted by the transponder, and (iii) a bracket for attaching the transponder to the rail car having a planar first surface adapted to be in planar contact with the rail car and a second surface which extends opposite the first surface and mates with the bottom surface of the transponder. The first end of a threaded stud for attaching the transponder to the bracket is attached to the bracket second surface along its longitudinal centerline. The second end of the stud extends above the bracket second surface a predetermined distance. An acorn nut threaded onto the stud, along with a conical washer, is used to clamp the transponder to the bracket, thereby ensuring that the nut can not be over torqued so as to crack the transponder. A clip for attaching the transponder to the bracket is also disposed along the longitudinal centerline of the bracket and extends from the bracket second surface. The bracket also has a hole located so as to be aligned with a memory access port in the transponder when the transponder is attached to the bracket.

DESCRIPTION OF THE PREFERRED EMBODIMENT

Figure 1:
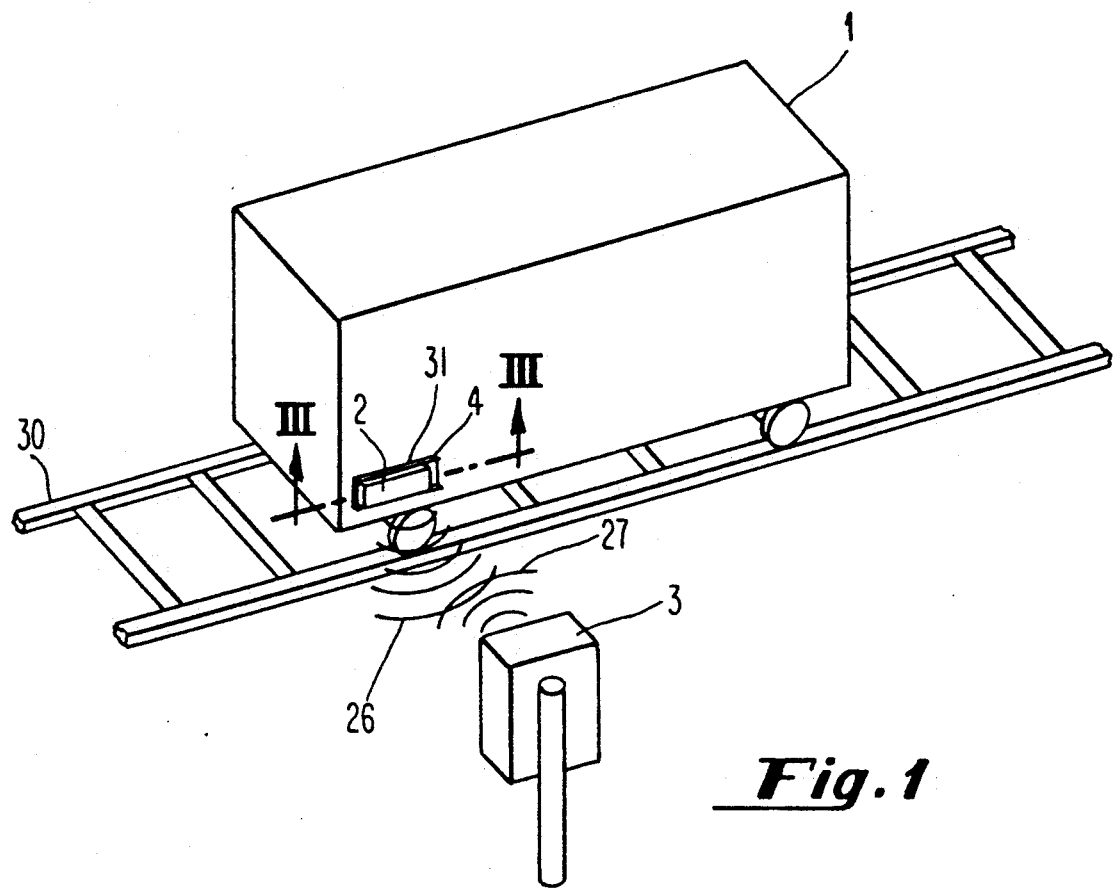
FIG. 1 is an isometric view, partially schematic, of a system for identifying rail cars according to the current invention.

There is shown in FIG. 1, a rail car 1 traveling along a track 30. Two transponders 2 (only one of which is shown) are attached to the rail car 1, one transponder being attached to each side of the rail car adjacent opposite ends of the rail car. The transponders 2 are attached to the rail car via brackets 4, discussed further below. As shown in FIG. 1, a reader 3 is disposed along side the track 30. In a fully operational system, transponders 2 would be attached to each rail car 1 in the system and readers 3 would be dispersed at intervals along the entire track system in the United States.

A code comprising a unique combination of alphanumeric characters, assigned to identify the individual rail car 1, is stored in a programmable memory in each of the transponders 2. When the transponder is interrogated by a signal 27 transmitted by the reader, the transponder converts the stored alphanumeric code into a sequential pattern of signals 26 at first and second frequencies which represent the unique combination of alphanumeric characters stored in the programmable memory of the transponder. The reader 3 receives the sequential pattern of signals 26 transmitted at the first and second frequencies by the transponder 2 and decodes them to identify the individual rail car 1. Such transponder/reader systems are disclosed in U.S. Pat. Nos. 4,075,632 (Baldwin et al.), 4,739,328 (Koelle et al.), 4,782,345 (Landt), 4,786,907 (Koelle), and 4,864,158 (Koelle et al.), which are hereby incorporated by reference.

Figure 2:
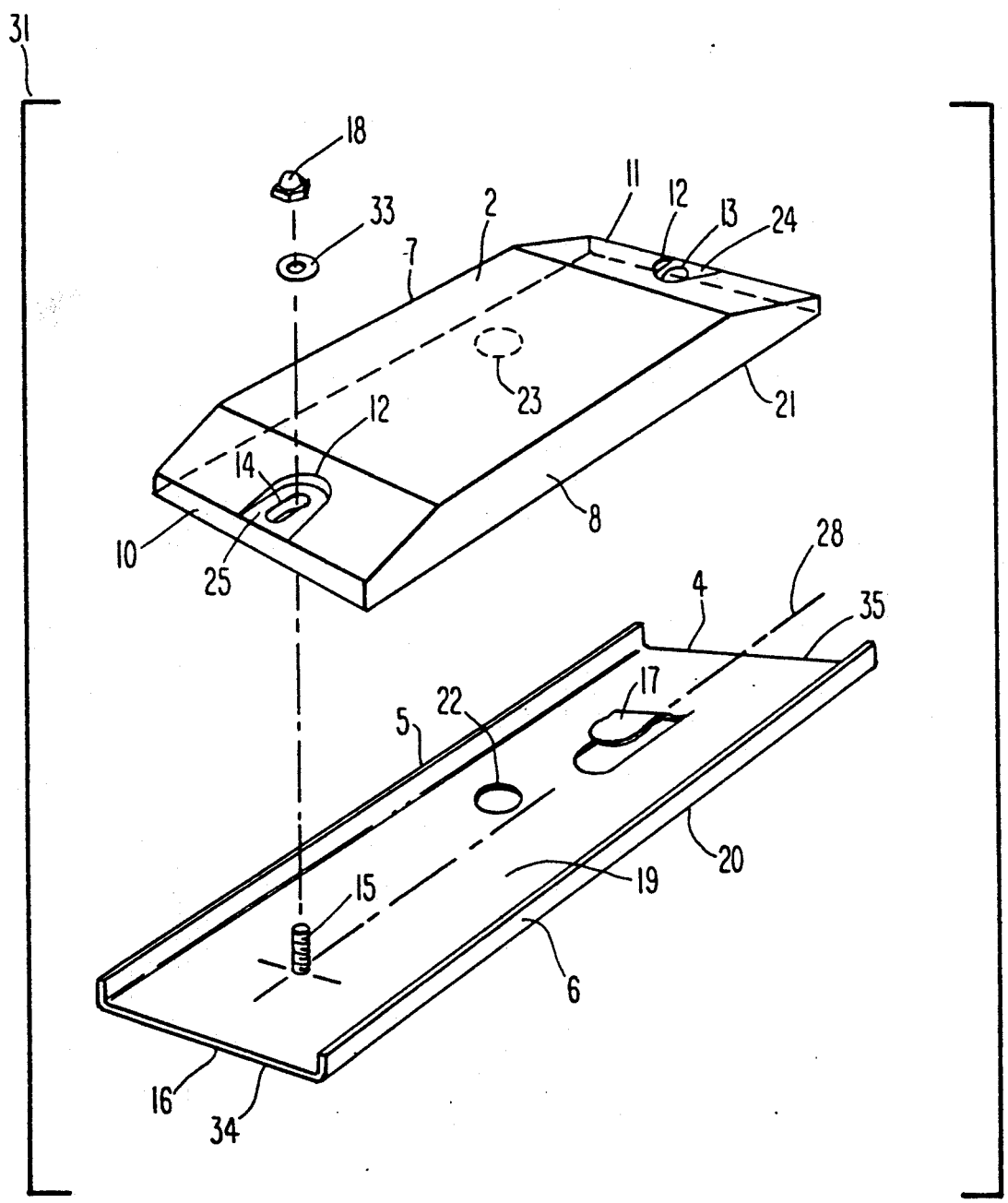
FIG. 2 is an exploded isometric view of the transponder/bracket assembly shown in FIG. 1.

FIG. 2 is an exploded view of the transponder/bracket assembly 31. As shown therein, the transponder 2 is approximately rectangular and has longitudinally extending sides 7 and 8, transverse ends 10 and 11 which define it length, and a planar bottom surface 21. A port 23 is formed in the bottom surface 21 to allow for programming the memory of the transponder 2. A memory programing port, such as that shown in FIG. 2, and an apparatus for performing such programming is disclosed in U.S. Pat. No. 4,835,377 (Brown), hereby incorporated by reference. A recess 12 is formed in the upper surface of the transponder 2 at each of its ends 10 and 11, thereby forming flanges 24 and 25 for attaching the transponder to the bracket 4. Holes 13 and 14 are formed in the flanges 24 and 25, respectively, hole 14 being elongated.

Figure 4:
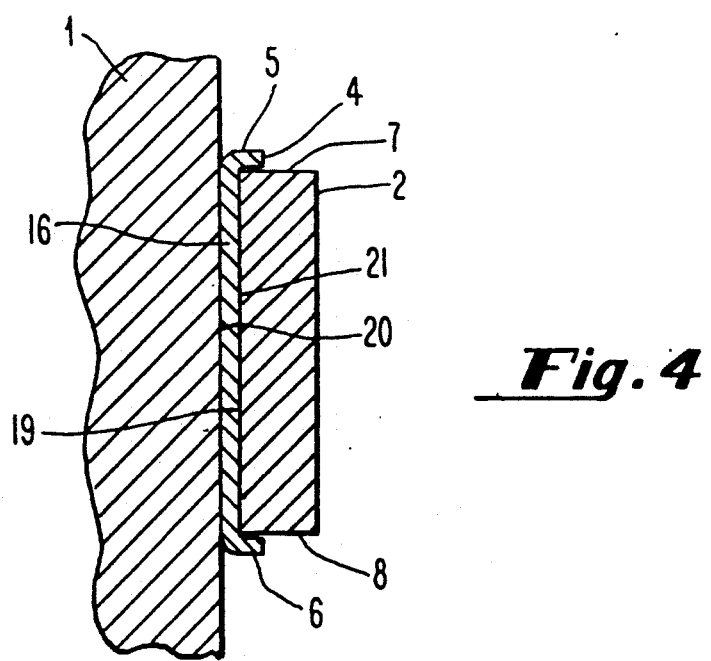
FIG. 4 is a cross-section through line IV—IV shown in FIG. 3.
Figure 3:
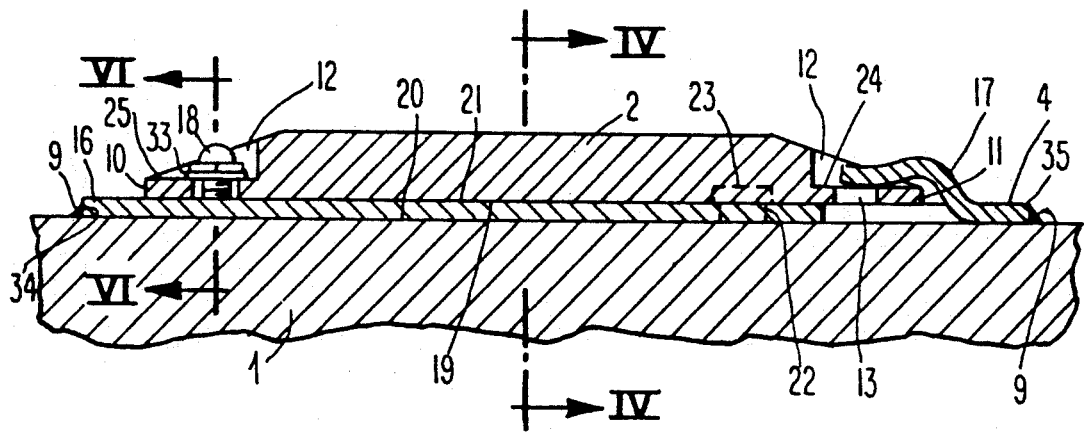
FIG. 3 is a cross-section through line III—III shown in FIG. 1.

FIG. 2 also shows the bracket 4 for attaching the transponder 2 to the rail car 1. In the preferred embodiment, the bracket 4 is made from carbon steel and has a mounting pad portion 16 having upper 19 and lower 20 approximately planar surfaces opposite each other. The bracket mounting pad upper surface 19 is adapted to mate with the transponder bottom surface 21 and the bracket mounting pad lower surface 20 is adapted to rest against the side of the rail car 1, as shown in FIGS. 3 and 4. Lips 5 and 6 are formed at the longitudinally extending sides of the bracket mounting pad portion 16 which are adapted to extend around the sides 7 and 8 of the transponder 2, as shown in FIG. 4.

A clip 17, which may be formed by cutting out and deforming a portion of the bracket mounting pad 16, as shown in FIG. 2, is disposed along the longitudinal centerline 28 of the bracket 4. The clip 17 is sufficiently flexible to allow it to be elastically bent upwards to facilitate insertion of the flange 24 under the clip. As shown in FIG. 3, the clip 17 is adapted to extend into the recess 12 and contact the flange 24 formed at the end 11 of the transponder 2.

Figure 5:
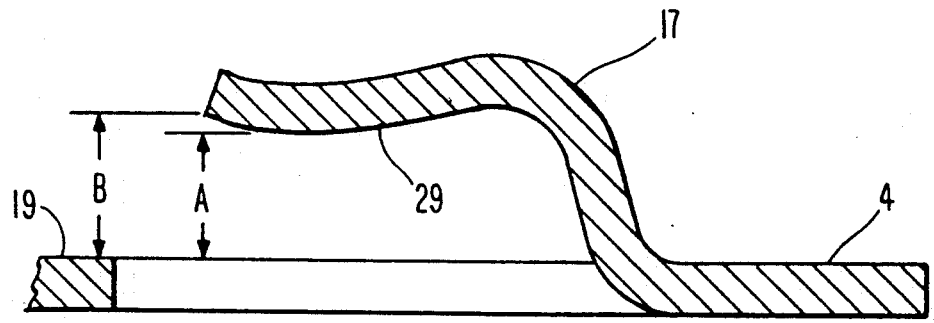
FIG. 5 is a detailed view of the clip portion of the bracket shown in FIG. 2.

As shown best in FIG. 5, the clip 17 has a bottom surface 29 which extends approximately parallel to the bracket mounting pad upper surface 19 but is somewhat curved. As a result, the clip bottom surface 29 and the bracket upper surface 19 form an opening having an entrance of height B and a throat of reduced height A. Height B is equal to or slightly greater than the thickness of the flange 24 so that the flange can be slipped easily under the clip 17. Height A is slightly less than the thickness of the flange 24 so that the clip 17 is elastically deformed when the flange 24 is inserted under it, thereby causing the clip to exert a compressive spring force pressing the flange 24 securely against the bracket upper surface 19. Since the thickness of the flange 24 is approximately 5/16 inch, in the preferred embodiment, dimension B is approximately 5/16 inch and dimension A is approximately 9/32 inch.

A threaded stainless steel stud 15 is welded to the bracket mounting pad upper surface 19 along the longitudinal centerline 28 of the bracket 4 at the end of the bracket opposite the clip 17. As shown in FIG. 3, the stud 15 is located so that when the flange at end 11 of the transponder is engaged under the clip 17, the stud extends through the elongated hole 14 in the flange 25 at end 10.

Figure 6:
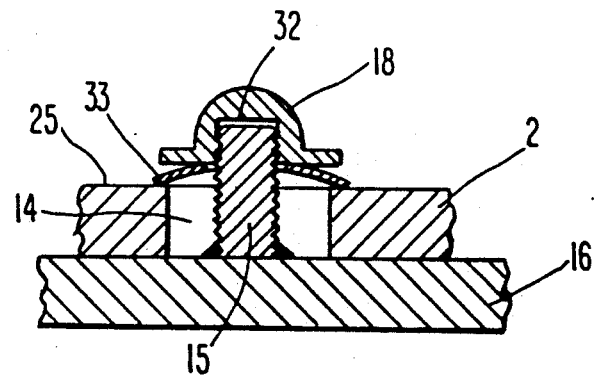
FIG. 6 is a detailed cross-section through line VI—VI shown in FIG. 3.

As shown best in FIG. 6, a conical washer 33 is installed over the stud 15. In the preferred embodiment, the washer is a #10 SAE type L regular conical washer. An acorn nut 18 is threaded onto the stud 15 over the washer 33 to clamp the transponder flange 25 to the bracket 4. According to an important aspect of the invention, the height of the stud 15 is (i) less than the sum of the thickness of the flange 25, the thickness of the conical washer 33 in its undeformed state, and the active length of the threaded hole 32 in the acorn nut 18 but (ii) greater than the sum of the thickness of the flange 25, the thickness of the conical washer 33 stock (i.e., the thickness of the washer if it were completely flattened), and the active length of the threaded hole 32. This allows the acorn nut 18 to partially, but not completely, flatten the conical washer when the nut is completely threaded down on the stud 15. However, hard contact is avoided since the conical washer retains it spring—that is, it is not completely flateened and is capable of further compression. As a result, the elastic deformation on the conical washer 33 exerts a spring force which firmly clamps the flange 25 against the bracket 4.

The application of excessive clamping force on the flange 25 by the acorn nut 18 is prevented because the limited depth of the hole 32 in the acorn nut limits the travel of the nut on the stud. Thus, the stud 15 bottoms out in the threaded hole 32 in the acorn nut 18 before sufficient clamping force is generated to crack the flange 25. This arrangement allows the transponder 2 to be firmly clamped to the bracket 4 while providing a positive means for preventing excessive clamping force. This is in contrast to the brackets heretofore know in the art which merely relied on restraint by the mechanic to prevent excessive clamping force.

Thus, according to the current invention, the transponder 2 can be attached to its mounting bracket 4 to form a transponder/bracket assembly 31 by simply (i) inserting the transponder flange 24 under clip 17, (ii) placing the transponder bottom surface 21 against the bracket mounting pad upper surface 19 so that stud 15 extends through hole 14, (iii) placing a conical washer 33 over the stud, and (iv) threading the acorn nut 18 onto the stud. In addition, various means well known in the art may be used to lock the acorn nut 18 onto the stud 15—for example, a sealer could be applied to the threads, the threads of the stud could be tri-roundular, etc. Note that only a single threaded fastener is required to attach the transducer to the bracket, unlike the devices heretofore known in the art which require installation of several screws.

After assembly, the transponder/bracket assembly 31 can be stored until needed. When a specific rail car for the transponder has been identified, the transponder/bracket assembly is retrieved from storage and the unique identification code for the rail car entered into the transponder memory using hole 22 in the bracket to gain access to the port 23. Thus, unlike the attachment devices heretofore known in the art, assembly of the transponder to the bracket need not be postponed until the transponder has been programed with its unique identification code.

After programing, the transponder/bracket assembly 31 is attached to the side of the rail car 1 by placing a weld 9—for example, by arc welding—along the transverse ends 34 and 35 of the bracket, as shown in FIG. 3. As shown in FIG. 3, the length of the bracket 4 is greater than the length of the transponder 2 so that there is adequate area between weld 9 and the transponder to dissipate a substantial portion of the heat from the welding, thereby avoiding overheating of the transponder 2. Since the overall length of the transponder is approximately 9.3 inches, in the preferred embodiment, the length of the bracket 4 is at least approximately 10.3 inches, preferably approximately 11.3 inches. According to the current invention, the bracket 4 is welded to the rail car 1 only along the transverse ends 34 and 35 to ensure there is adequate flexibility between the rail car and the bracket so that flexing of the rail car does not crack the welds 9. Should the transponder 2 require repair or reprogramming, it can be removed by unfastening the acorn nut 18 and disengaging the transponder from the bracket 4.

Note that since the transponder bottom surface 21 makes planar contact with the bracket upper surface 19 and the bracket lower surface 20 makes planar contact with the rail car 1, there is a substantial conductive heat flow path from the transponder 2 to the rail car 1. This conductive heat flow path prevents excessive build up of heat in the transponder when the rail car is placed in the thaw shed. In the preferred embodiment, the bracket mounting pad lower surface 20 has a planar area of at least approximately 27 square inches.

Although the current invention has been illustrated by reference to a rail car, those skilled in the art will appreciate that the invention is also applicable to trucks, shipping containers, etc. Moreover, the present invention may be embodied in other specific forms without departing from the spirit or essential attributes thereof and, accordingly, reference should be made to the appended claims, rather than to the foregoing specification, as indicating the scope of the invention.

What is claimed is:

1. A system for automatic identification of rail cars, comprising:
   a) a transponder adapted to transmit a first signal containing information identifying one of said rail cars when interrogated, said transponder having first and second transverse ends, a flange having a thickness formed on one of said transverse ends, an opening formed in said flange;
   b) a reader adapted to interrogate said transponder by transmitting a second signal thereto and to receive and decode said first signal transmitted by said transponder; and
   c) a bracket for attaching said transponder to said rail car, said bracket having:
      (i) means for applying a force clamping said transponder to said bracket, said clamping force applying means having first and second means for applying a spring force at said first and second transverse ends of said transponder, respectively, said first spring force applying means comprising a spring, a threaded member extending through said flange opening, and a nut having an active threaded length adapted to thread onto said threaded member, and
      (ii) means for positively limiting the amount of said clamping force applied by said first spring force applying means, said spring force limiting means comprising the length of said threaded member being greater than the combination of said thickness of said flange and said active threaded length of said nut.

2. The system according to claim 1, wherein said bracket has a first surface having a planar area adapted to be in contact with said rail car.

3. The system according to claim 1, wherein said threaded member is a stud.

4. The system according to claim 1, wherein said nut comprises an acorn nut adapted to thread onto said threaded member.

5. The system according to claim 1, wherein said bracket has first and second transverse ends, said bracket attached to said rail car by welding only along said transverse ends.

6. The system according to claim 1, wherein said bracket has first and second transverse ends defining the length of said bracket and along which said bracket is welded to said rail car, the length of said bracket being greater than the length of said transponder by a predetermined distance, thereby allowing a substantial portion of the heat associated with said welding to be dissipated.

7. The system according to claim 6, wherein said predetermined distance is at least approximately one inch.

8. The system according to claim 1, wherein said transponder has an access port for entering information into said transponder, and wherein said bracket has a hole located so as to be aligned with said access port when said transponder is attached to said bracket.

9. An apparatus for attaching a transponder to an object, said transponder having a bottom surface, first and second longitudinal sides, and first and second transverse ends, comprising a bracket having:
   a) a first surface adapted to mate with said transponder bottom surface;
   b) means for applying a spring force for clamping said transponder bottom surface against said bracket first surface, said spring force applying means comprising (i) a spring, (ii) a threaded member extending a predetermined distance above said bracket first surface, and (iii) a nut adapted to thread onto said threaded member; and
   c) means for preventing said spring clamping force from exceeding a predetermined amount comprising means for limiting the travel of said nut on said threaded member.

10. The apparatus according to claim 9, wherein said threaded means applies said clamping force to said first transponder end, and further comprising a clip adapted to engage said transponder second end.

11. The apparatus according to claim 10, further comprising a flange formed on said second transponder end, and wherein said clip and said bracket first surface form an opening having an entrance having a first height and a throat having a second height, said second height being less than said first height and less than the thickness of said flange.

12. The system according to claim 1, wherein:
   a) said transponder has first and second transverse ends;
   b) said clamping force applying means comprises first and second means for applying a spring force at said first and second transverse ends, respectively, said first and second spring force applying means being the only means for clamping said transponder to said bracket.

13. The system according to claim 1, wherein said second spring force applying means comprises a clip attached to said bracket and said spring comprises a conical washer.

* * * * *